US005153623A

United States Patent [19]

Bouvier

[11] Patent Number: 5,153,623

[45] Date of Patent: Oct. 6, 1992

[54] SURVEILLANCE CAMERA WITH INTEGRATED SUPPORT

[75] Inventor: Bernard Bouvier, Eragny/Oise, France

[73] Assignee: Thomson Surveillance Video, Cergy Saint Christophe, France

[21] Appl. No.: 728,092

[22] Filed: Jul. 10, 1991

[30] Foreign Application Priority Data

Jul. 27, 1990 [FR] France ............................... 90 09615

[51] Int. Cl.$^5$ ............................................ G03B 29/00

[52] U.S. Cl. ...................................... 354/81; 358/108

[58] Field of Search .................. 354/81; 358/108, 109, 358/229

[56] References Cited

U.S. PATENT DOCUMENTS 4,225,881 9/1980 Tovi .................................... 358/108

4,855,823 8/1989 Struhs et al. ........................ 358/108

FOREIGN PATENT DOCUMENTS 2614438 10/1988 France .

*Primary Examiner*—L. T. Hix

*Assistant Examiner*—David M. Gray

*Attorney, Agent, or Firm*—Marmorek, Guttman & Rubenstein

[57] ABSTRACT

The surveillance camera has a filming device placed in a package with a hollow support frame constituted by a back and at least one cardan fork arm on which there rests a hollow, preferably spherical, shell. The filming device is placed in the shell, the connection wires passing from the shell into the support frame through at least one hinging means providing for the mobility of the shell about an axis U that passes through its center and is perpendicular to the cardan fork arm and the support frame being itself movable about an axis V perpendicular to the cardan fork arm. Application to the surveillance of private or public premises.

8 Claims, 3 Drawing Sheets

SURVEILLANCE CAMERA WITH INTEGRATED SUPPORT

BACKGROUND OF THE INVENTION

1. Field of the Invention

The invention concerns a surveillance camera with integrated support for the surveillance of public or private premises.

2. Description of the Prior Art

A known surveillance camera, comprising a filming device enclosed in a casing, is generally installed in a support independent of the package and has visible input/output connection wires, thus making the camera vulnerable and subject to acts of vandalism. Besides, such a camera is generally not discreet and is therefore easy to locate. It is difficult, even impossible, to swivel such a camera, and this means that it cannot be installed just anywhere. It cannot be installed immediately, and requires adequate tools.

There also exist cameras that can be flush-mounted and are therefore discreet and more resistant to acts of vandalism, but they are difficult to install, cannot been swivelled and cannot be used for surveillance in all directions of space.

SUMMARY OF THE INVENTION

An object of the invention is to make a discreet, vandal-proof camera that is easy to install without any particular tools, can be easily pointed in all directions of space and can be adapted to a positioning on a wall or on a ceiling.

According to the invention, there is proposed a camera with integrated support, comprising a filming device placed in a casing and connection wires, wherein the casing has a hollow shell enclosing the filming device, a hollow part comprising at least one cardan fork arm for the support of this shell, a ring fastener supporting the hollow part and designed to be fixed to a surface of a room to be put under surveillance, hinging means between the cardan fork arm and the shell enabling the rotation of the shell about a first axis U passing through the center of the shell and perpendicular to the cardan fork arm, the hollow part being movable about a second axis V of rotation perpendicular to the first axis U and parallel to the cardan fork arm, and wherein the connection wires pass from the interior of the shell to the interior of the hollow part through the hinging means.

BRIEF DESCRIPTION OF THE DRAWINGS

Other features and advantages of the invention shall appear clearly from the following description, given as a non-restrictive example and made with reference to the appended drawings, of which.

DESCRIPTION OF THE PREFERRED EMBODIMENT

Figure 1:
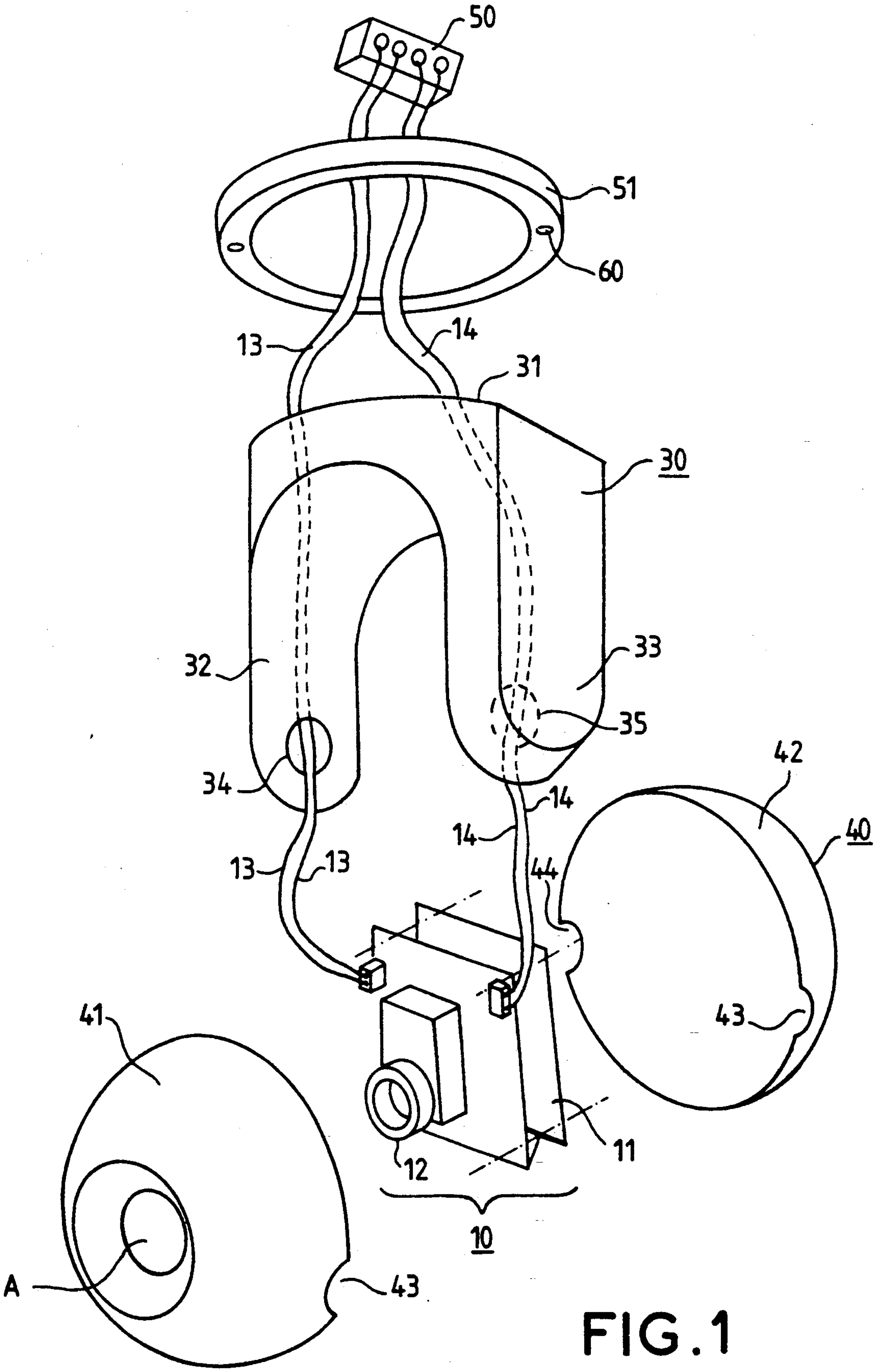
FIG. 1 shows an exploded view of an exemplary embodiment of the camera according to the invention.

FIG. 1 shows an exploded view of an exemplary embodiment of the camera according to the invention. The camera has a filming device 10 and a casing formed by an envelope part 40, called a shell, a part 30 for the support of the shell called a support frame and a ring fastener 51 supporting the support frame. The filming device 10 is essentially formed by an electronic circuit associated with an integrated optical system 11, an objective 12, wires 13, 14 for the connection of the electrical supply and of the video signal. The support-forming frame 30 has a back 31 and two parallel cardan fork arms 32, 33. The shell 40 preferably has a spherical shape but it may also have a cylindrical, parallelepiped or other shape, and is designed to receive the filming device 10. It is constituted by two hollow half-shells 41, 42, one of which has a hole at its top A. This hole has, for example, the shape of a truncated cone with a matching diameter that enables it to house the objective 12 of the shooting device 10 and enables the focusing of the image to be adjusted. Each half-shell 41, 42 has two recesses 43 and 44 on its periphery. These recesses 43 and 44 enable the passage of the wires 13, 14 and the separation of the electrical supply wires of the video signal transmission wires. Preferably, these two recesses are diametrically opposite to each other. When the filming device 10 is placed in the shell 40, the two half-shells are closed by a closing system, for example with clips or screws, or they are clamped by means of the holes 34 and 35 of the support frame 30.

The support frame 30 is designed to receive the shell 40 between its two cardan fork arms 32, 33. It is hollow and has a hole 34, 35 on its internal face, at the ends of the two cardan fork arms. These holes 34, 35 are positioned so as to face the two recesses 43, 44 of the shell 40 and enable the introduction, into the support frame 30, of the camera connection wires 13, 14. In this way, the wires are shielded and cannot be seen, and it is difficult for ill-intentioned persons to reach them. To provide for the locking of the shell 40 in the support frame 30, the back of the support frame is pre-stressed so that the two cardan fork arms 32, 33 tend to tighten and so that friction is set up between the two cardan fork arms and the shell 40. Holes are made in the external surface of the back 31 of the support frame 30, enabling the connection wires 13, 14 to come out so that they can be connected by means of a connection strip 50. The support frame may then be fixed, for example by a device with clips, to a ring fastener 51 screwed by means of two screws 60 into the wall or into the ceiling.

When the camera is mounted and fixed to a wall or to the ceiling of a room, the connection wires are not visible and the camera has the advantage of having the external appearance of a light spot. It is therefore difficult to locate, and less likely to undergo acts of vandalism.

Figure 2:
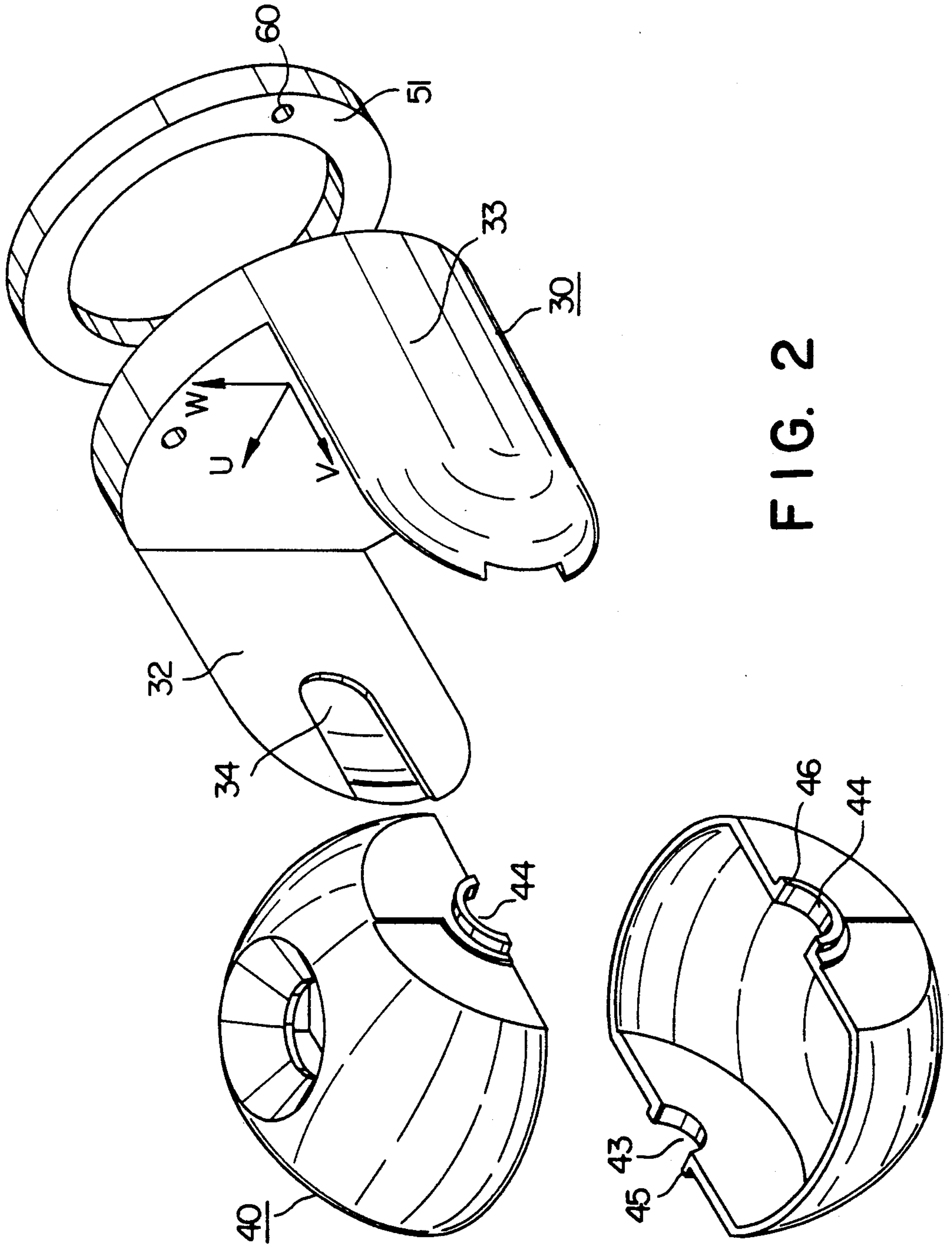
FIG. 2 shows a view of the casing of the camera showing its three axes of orientation according to the invention.

FIG. 2 shows a view of the casing of the camera, showing its three axes of orientation. The structure of the casing enables easy orientation of the camera in every direction of space. The two recesses 43, 44 of the shell 40 are provided, on their rim, with a projecting shoulder 45, 46. When the shell 40 is housed between the two cardan fork arms 32, 33, the shoulders 45, 46 rest on the holes 34, 35 which thus constitute a hinge by means of which the shell can rotate. The shell 40 can therefore rotate about an axis U that passes through its center and is perpendicular to the two cardan fork arms 32, 33. The support frame can rotate about an axis V perpendicular to the axis U and parallel to the two cardan fork arms 32, 33. Finally, the camera may be shifted along an axis W, parallel to the surface to which it is fixed.

Figure 3:
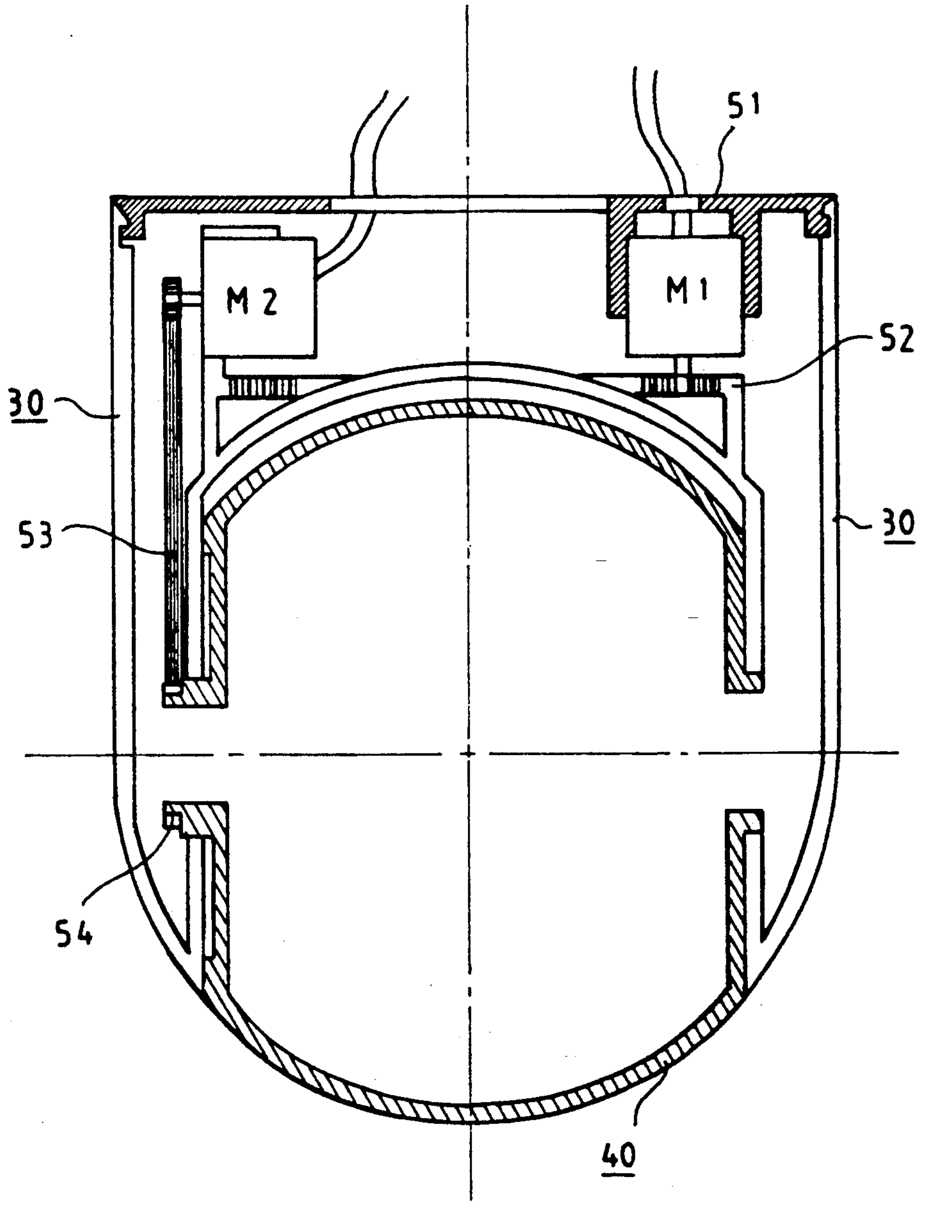
FIG. 3 shows a sectional view of the camera showing an example of the motor-driven operation of the camera according to the invention.

FIG. 3 shows a sectional view of the casing showing an example of motor-driven operation of the camera, according to the invention. Since the camera can be oriented along three axes, U, V, W, it can be motor-driven by means of two motors M1, M2, the motor M1 making the support frame 30 rotate and the motor M2 making the shell 40 rotate. The motor M1 is, for example, fastened to a part that is fixedly joined to the ring fastener 51 and drives the support frame 30, for example, by means of a toothed wheel 52 molded in the support frame 30. The motor M2 is, for example, fixed to the support frame 30 and drives the shell 40 by a mechanism comprising a toothed belt 53 and a gear system 54. The camera may then be remote controlled.

The invention is not limited to the example specifically described herein. In particular, it is not indispensable for the support frame to have two cardan fork arms. Just one cardan fork arm would suffice. However, the two cardan fork arms ensure the friction of the shell and enable it to be locked whereas, with only one cardan fork arm, it would be necessary to provide for a system to lock the camera.

In the same way, the camera described has two recesses 43, 44 on each half-shell 41, 42. This enables the supply wires to be separated from the video signal transmission wires, but only one recess is sufficient, the essential feature being the integration of the wires within the support frame 30 to strengthen the resistance of the camera against acts of vandalism.

What is claimed is:

1. A surveillance camera with integrated support, comprising a filming device located in a casing and connection wires, wherein the casing has a hollow shell enclosing the filming device, a hollow part for the support of this shell, said hollow part comprising a support frame constituted by a back and two parallel cardan fork arms between which the shell is housed, hinging means between the cardan fork arms and the shell, the back of the support frame being pre-stressed to provide friction between two cardan fork arms and the shell, and the connection wires passing from the interior of the shell to the interior of the hollow part through the hinging means.

2. A surveillance camera according to claim 1, wherein the casing further comprises a ring fastener supporting the hollow part and designed to be fixed to a surface of a room to be put under surveillance.

3. A surveillance camera according to claim 2, wherein the shell is movable about a first axis of rotation passing through the center of the shell and perpendicular to the cardan fork arms, and the hollow part is movable about a second axis of rotation perpendicular to the first axis and parallel to the cardan fork arms.

4. A surveillance camera according to claim 1 or 3, wherein the shell is constituted by two hollow half-shells, one of which has a hole with a matching diameter to house an objective of the filming device.

5. A surveillance camera according to claim 4 wherein the shell has two diametrically opposite recesses to enable the hinging of the shell on the cardan fork arms, each recess being provided with a shoulder designed to come to rest on two respective holes positioned on an internal face of each cardan fork arm.

6. A surveillance camera according to claim 5, wherein the shell is cylindrical.

7. A surveillance camera according to claim 5, wherein the shell is parallelepiped-shaped.

8. A surveillance camera according to claim 3 further comprising two motors, designed respectively to make the support frame and the shell rotate about the first axis and the second axis respectively.

* * * * *